US006991073B2

(12) United States Patent
Macke et al.

(10) Patent No.: US 6,991,073 B2

(45) Date of Patent: Jan. 31, 2006

(54) DISK BRAKE, IN PARTICULAR, FOR A UTILITY VEHICLE

(75) Inventors: Wlodzimierz Macke, Olching (DE); Johann Iraschko, Schweitenkirchen (DE)

(73) Assignee: Knorr-Bremse Systeme Fuer Nutzfahrzeuge GmbH, Munich (DE)

(*) Notice: Subject to any disclaimer, the term of this patent is extended or adjusted under 35 U.S.C. 154(b) by 0 days.

(21) Appl. No.: 10/803,105

(22) Filed: Mar. 18, 2004

(65) Prior Publication Data

US 2004/0173420 A1 Sep. 9, 2004

Related U.S. Application Data

(63) Continuation of application No. PCT/EP02/10418, filed on Sep. 17, 2002.

(30) Foreign Application Priority Data

Sep. 18, 2001 (DE) ................................ 101 45 908

(51) Int. Cl.
*F16D 65/14* (2006.01)

(52) U.S. Cl. ................ 188/73.45; 188/73.1; 188/73.31

(58) Field of Classification Search ............. 188/73.44, 188/73.45, 73.1, 73.31, 73.42, 73.43, 73.35, 188/73.37
See application file for complete search history.

(56) References Cited

U.S. PATENT DOCUMENTS

| | | | | | |
|---|---|---|---|---|---|
| 4,265,340 | A | * | 5/1981 | Scott et al. | 188/73.44 |
| 4,290,505 | A | | 9/1981 | Kramer | |
| 4,331,221 | A | * | 5/1982 | Evans et al. | 188/73.44 |
| 4,807,725 | A | * | 2/1989 | Weiler et al. | 188/73.44 |
| 5,622,241 | A | * | 4/1997 | Null | 188/73.42 |
| 5,659,380 | A | * | 8/1997 | Kobayashi | 351/110 |
| 5,730,258 | A | * | 3/1998 | Evans | 188/73.44 |
| 5,927,446 | A | * | 7/1999 | Evans | 188/73.44 |
| 6,026,938 | A | * | 2/2000 | Demoise et al. | 188/73.44 |

FOREIGN PATENT DOCUMENTS

| | | |
|---|---|---|
| GB | 1106237 | 6/1965 |
| JP | 55-054732 | 4/1980 |
| JP | 58-061340 | 4/1983 |
| JP | 2003320932 A * | 11/2003 |

* cited by examiner

*Primary Examiner*—Melanie Torres
(74) *Attorney, Agent, or Firm*—Crowell & Moring LLP

(57) ABSTRACT

The invention relates to a disk brake, in particular for a utility vehicle, comprising a brake caliper that encompasses a brake disk. The caliper is fixed to a brake support of the utility vehicle by means of fixing elements and can be axially displaced in relation to the brake disk. One fixing element is configured as a fixed bearing and the other as a floating bearing. The disk brake is configured in such a way that the floating bearing consists of a guide bush, part of which have a different wall thickness and in which a bearing bolt with a circular cross-section is guided, or a guide bush with an even wall thickness, in which a bearing bolt with an oval cross-section is guided.

20 Claims, 5 Drawing Sheets

DISK BRAKE, IN PARTICULAR, FOR A UTILITY VEHICLE

CROSS-REFERENCE TO RELATED APPLICATIONS

This application is a continuation of PCT Application No. PCT/EP02/10418 filed on Sep. 17, 2002.

The present invention relates to a disk brake, in particular for a utility vehicle, having a caliper straddling a brake disk, which caliper is axially displaceably relative to the brake disk fixed to a brake support of the utility vehicle via two fixing elements, one fixing element being constructed as a fixed bearing and the other fixing element being constructed as a movable bearing.

In the case of such disk brakes, the caliper is connected through the use of fixing elements with the brake support, which is connected to the vehicle. Bearing bolts engage in the brake support and, on the other side, are guided in slide bearings of the caliper such that an axial displacement of the caliper can take place relative to the stationary brake support. Of the slide bearings, one slide bearing is constructed as a fixed bearing with a slight sliding play, while the other slide bearing operates as a movable bearing, whereby especially manufacturing tolerances are compensated.

In order to achieve such compensation, it is known to guide the bearing bolt of the movable bearing in a rubber bush, in contrast to which the bearing bolt of the fixed bearing is disposed in a brass bush.

Although, as a result of the elasticity of the rubber bush, a corresponding tolerance compensation can be achieved transversely to the axial direction, this solution is disadvantageous in that, as a result of the construction, the rubber bush cannot be sufficiently encapsulated, so that it may become dirty during operation of the vehicle. This may reduce the service life of the rubber bush so that repairs become more frequently necessary. Specifically, for a use in the field of commercial vehicles, any interruption of the service operation of the vehicle due to repairs represents a considerable cost factor.

Another solution according to the state of the art provides that the movable bearing, like the fixed bearing, has guide bushes, for example, made of brass. The guide bush of the movable bearing has an excessively large play with respect to the introduced bearing bolt. This play extends along the entire circumference, which generates a relatively high amount of noise and results in increased stress to the bearing, which naturally also leads to premature wear.

In order to exclude these disadvantages, it is also known to press the guide bush of the movable bearing into an oval bore of the caliper, the play on both sides extending to the guide bush in the plane in which the fixed bearing is placed. Perpendicular thereto, as in the case of the fixed bearing, on the whole, no play or only very little play is provided.

However, for placing the oval bore in the caliper, a cost-intensive, high-expenditure machining is required.

It is therefore an object of the invention to further develop a disk brake of the above-mentioned type such that a cost-effective manufacturing and mounting of the fixing elements can be achieved and their service life is improved.

This object is achieved by providing a disk brake having a caliper straddling a brake disk, which caliper is axially displaceably relative to the brake disk fixed to a brake support of the utility vehicle via two fixing elements, one fixing element being constructed as a fixed bearing and the other fixing element being constructed as a movable bearing. The movable bearing comprises a guide bush with partially different wall thicknesses (S1, S2) and a bearing bolt, which bolt is guided therein and preferably has a round cross-section On the one hand, the invention now eliminates a high-expenditure machining of the caliper because only a round bore has to be provided for receiving the guide bush. On the other hand, the movable bearing, particularly the guide bush, is protected from becoming dirty in such a manner that a resulting excessive stressing is virtually eliminated. Furthermore, the noise generation described in connection with the state of the art is minimized because the greater play can be provided only in the actually desired direction.

In comparison to the above-mentioned rubber bush, which has been used up to now, the required replacement force of the caliper is lower because the bearing bolt is not enclosed along its complete circumference, whereby the frictional forces are minimized.

In addition, by means of the invention, a precise guiding of the bearing bolt is achieved in the direction situated perpendicular to the plane of the tolerance compensation; that is, perpendicular to the longitudinal dimension of the internal bore of the guide bush, which in principle has an oval cross-section, or of the bearing bolt, which has an oval cross-section. When the guide bush with the partially different wall thicknesses characteristics is used, the bearing bolt guided therein preferably has a round cross-section. However, in principle, a different cross-sectional shape is also contemplated. It is important that the bearing bolt can be radially moved within the play, in which case the internal bore of the guide bush may have an oblong cross-section. In this case, the semicircular ends are mutually connected by straight lines.

A guide bush corresponding to the present invention can be produced in a simple manner. Thus, the guide bush, which has an oval inner hole as a result of the different wall thicknesses, while the outer contour is circular, can be shaped from a profiled band-shaped blank whose one side has a smooth surface and forms the outer shell surface of the guide bush, while the other side of the blank is wavy, the respective wave crest corresponding to the thicker wall thickness and the respective wave trough corresponding to the thinner wall thickness.

The blank, which can be cut to lengths from a band material, is rolled to form a guide bush, which can take place without any large manufacturing expenditures. The length of the blank corresponds approximately to the circumference of the guide bush, and the width corresponds approximately to its length.

Steel, coated steel (for example, coated with a sliding material, bronze, brass, a plastic material), a composite material or a suitable other material, can be used as the material of the profiled band. To this extent, corresponding demands on the material can be taken into account without any problem.

The above-mentioned wave profiling of the band can extend in the longitudinal direction. The width of the band corresponds to the circumference of the guide bush.

However, it is also contemplated to provide the course of the waves transversely to the longitudinal dimension of the band. The width of the band will then correspond to the length of the guide bush, while the length to be cut is equal to the circumference of the guide bush.

It is remarkable that the manufacturing costs of a guide bush produced in this manner are no higher than those of a conventional guide bush which has a circular-ring-shaped cross-section.

Naturally, the blanks can also be profiled individually for the production of the guide bushes. However, the above-described production from a profiled band offers considerable advantages, particularly with respect to the fact that such disk brakes and thus the guide bushes are used in large piece numbers.

In order to permit a precisely positioned mounting of the guide bush of the movable bearing, which is absolutely necessary for a perfect operation, the guide bush can be provided with a marking, for example, a notching which, in correspondence with a marking on the caliper, facilitates a precisely positioned installation of the guide bush.

In the case of a disk brake having its movable bearing comprise a guide bush with a uniform wall thickness and a bearing bolt which is guided therein and has an oval cross-section, the same effect is achieved with respect to the tolerance compensation as in the case of the disk brake according to the above embodiment. A guide bush with a round cross-section and with the same wall thickness is pressed into a round bore of the caliper, in which guide bush the bearing bolt is guided which has an oval cross-section. The smallest cross-sectional dimension of the bearing bolt extends in the plane of the tolerance compensation; that is, in the plane in which the fixed bearing is arranged. In contrast, the largest cross-sectional dimension corresponds approximately to the inside diameter of the guide bush.

Additional advantageous constructions are described and claimed herein. In the following, embodiments of the invention will be described by means of the attached drawings.

DETAILED DESCRIPTION OF THE DRAWINGS

Figure 1:
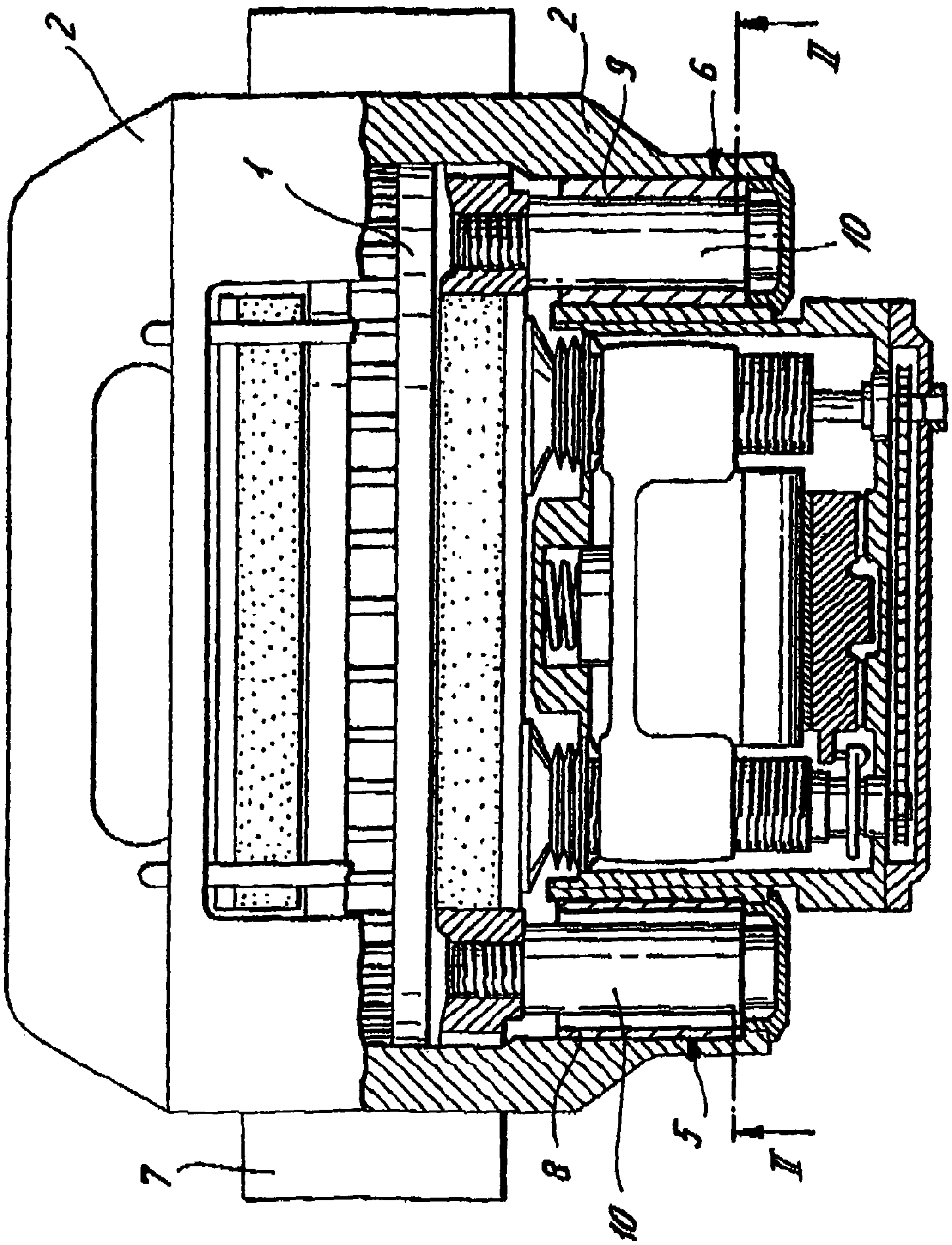
FIG. 1 is a partial longitudinal sectional view of a disk brake according to the invention.

FIG. 1 illustrates a disk brake, in particular for a utility vehicle, which, in its basic construction, has a caliper 2 straddling a ventilated brake disk 1, which is fastened to an axle of the utility vehicle (not shown).

The caliper 2 is axially displaceably fastened, relative to the brake disk, to a brake support (anchor or torque plate) 7 of the utility vehicle.

For this purpose, two fixing elements 5, 6 are provided, of which the fixing element 5 is constructed as a movable bearing and the fixing element 6 is constructed as a fixed bearing.

The two fixing elements 5, 6 have one guide bush 8, 9 respectively, as well as a bearing bolt 10 guided therein, in which case the guide bushes 8,9, which are round at their outer circumference, are pressed into round bores of the caliper 2.

The bearing bolts 10 are screwed into the brake support 7 and are thus stationary with respect to the caliper 2, while the guide bushes 8, 9 are fixedly connected with the caliper 2 and, from there, are axially displaceably disposed on the bearing bolt 10 together with the caliper 2.

Figure 2:
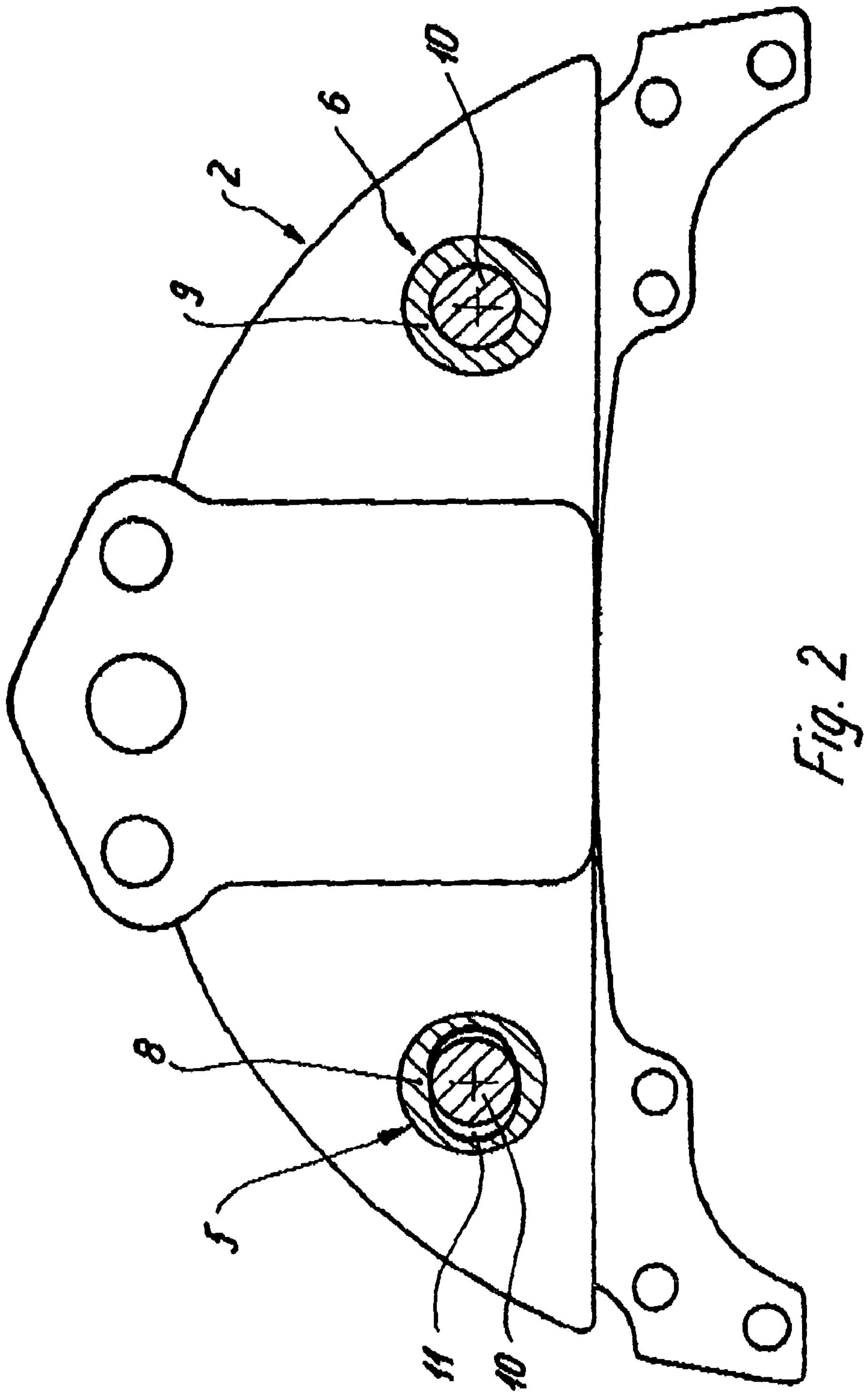
FIG. 2 is a detail view of the disk brake viewed in the direction II—II in FIG. 1.

As shown particularly clearly in FIG. 2, the guide bush 8 of the movable bearing 5 has partially different wall thicknesses, the cross-section of the guide bush 8 being constructed such that a mirror-symmetrical shape with the formation of an oblong oval bore 11 is obtained, whose largest width extends in the plane on which the fixed bearing is situated 6. The smallest dimension, which is present perpendicular to the largest dimension of the oval bore 11, corresponds approximately to the assigned diameter of the round bearing bolt 10. Thus, a lateral play of the bearing bolt 10 takes place with respect to the oval bore 11, which play corresponds to the difference between its largest dimension and the diameter of the cylindrical bearing bolt 10.

In contrast, the guide bush 9 is constructed as a cylindrical hollow body in which the cylindrical bearing bolt 10 is guided with such a small play that a perfect axial displacement of the guide bush 9 and thus of the caliper 2 is permitted.

Figure 3:
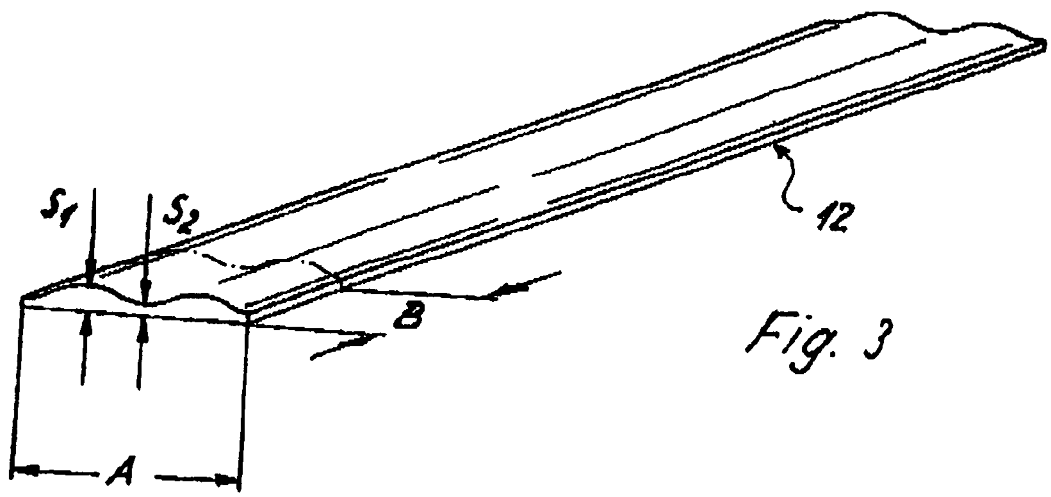
FIGS. 3 and 4, respectively, are perspective views of a profiled band for manufacturing a guide bush according to the invention.
Figure 4:
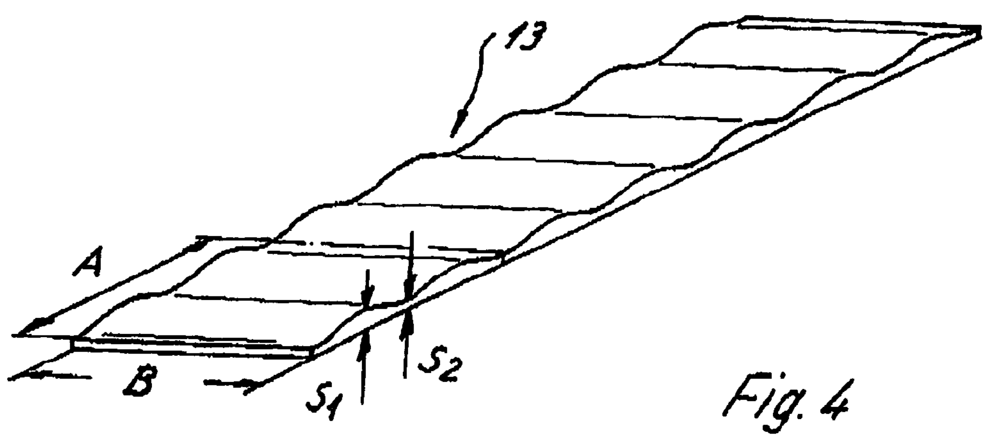

FIGS. 3 and 4 each show unfinished shapes for producing the guide bush 8 of the movable bearing 5.

The embodiment illustrated FIG. 3 shows a profiled band 12 which, as a wave profile, is provided with wavy profilings extending in the longitudinal direction of the profiled band 12. The width A of the profilings corresponds to the circumference of the guide bush 8, while the measurement B, by which the raw materials for several guide bushes 8 are cut to the desired lengths, corresponds to the length of the finished guide bush 8.

The wave profiling consists of two wave crests, whose heights define the largest wall thickness S1 of the guide bush 8, and of adjoining wave troughs having a smaller wall thickness S2.

After cutting the band 12 into lengths corresponding to the measurement B, the guide bush is provided with its final shape by means of rolling, in which rolled shape it takes on a cylindrical shell surface.

In a like manner, sections like those cut off a profiled band 13 according to FIG. 4 are also shaped to form the guide bush 8. However, here, the profilings extend transversely to the longitudinal dimension of the profiled band 13, so that the cut-off length A defines the outer circumference of the guide bush 8, while the width B of the profiled band corresponds to the length of the guide bush 8.

However, the guide bushes 8 are preferably produced from a profiled band 12 of FIG. 3 because this profiled band 12 can be manufactured more easily than the profiled band 13 according to FIG. 4.

Figure 2A:
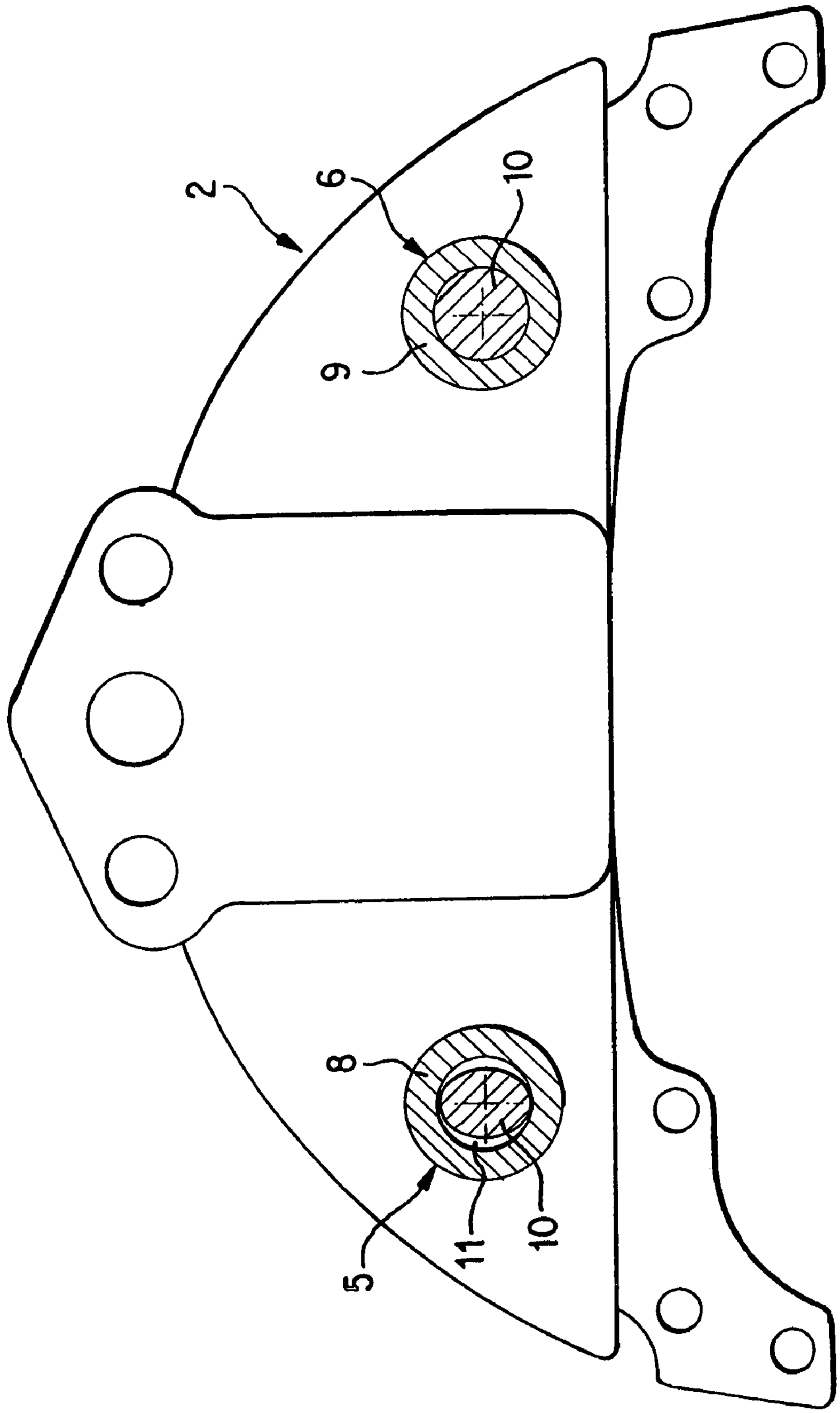
FIG. 2*a* is a detail view of another embodiment of the disk brake viewed in the direction II—II in FIG. 1.

FIG. 2*a* illustrates an alternate embodiment wherein the guide bush 8 has a round cross-section with a uniform wall thickness. The guide bush 8 is pressed into a round bore of the caliper. In this embodiment, however, the bearing bolt 10 is provided with an oval cross-section. The smallest cross-sectional dimension of the bearing bolt 10 extends in the plane of the tolerance compensation, that is, in the plane in which the fixed bearing is arranged. By contrast, the largest cross-sectional dimension of the bearing bolt 10 corresponds approximately to the inner diameter of the guide bush 8.

Figure 5:
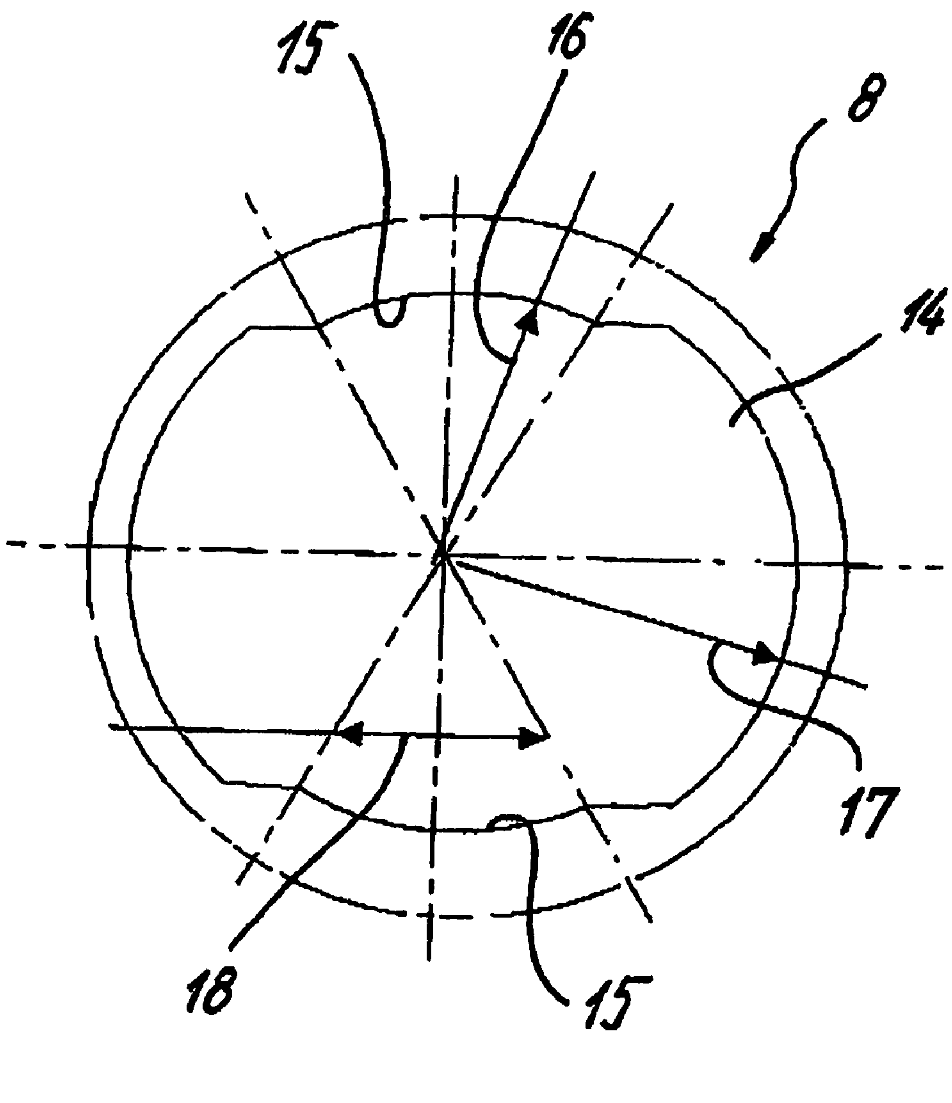
FIG. 5 is a schematic diagram of a guide bush having different internal radii according to the present invention.

Referring to FIG. 5, there is shown a guide bush 8 formed from a non-continuously shaped profile band. In this case, arrow 16 indicates the inner radius corresponding to the outer circumference of the bearing bolt 10, whereas arrow 17 indicates the larger radius formed in the plane of the fixed bearing 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disk brake for a vehicle, comprising:

a caliper adapted to straddle a brake disk, said caliper being axially displaceable relative to the brake disk;

two fixing elements by which the caliper is fixed to a brake support of the vehicle, one fixing element being a fixed bearing and the other fixing element being a movable bearing;

wherein the movable bearing comprises a guide bush having non-uniform wall thicknesses and an interior bore with a mirror symmetrical oval cross-section, and a bearing bolt guided in said interior bore of said guide bush, said bearing bolt being movable radially relative to the guide bush and having a round cross-section.

2. The disk brake according to claim 1, wherein a smallest clear opening measurement of the guide bush corresponds approximately to a diameter of the bearing bolt.

3. The disk brake according to claim 1, wherein the interior bore has an oblong-hole construction.

4. The disk brake according to claim 1, wherein a largest diameter of the oval bore of the guide bush is arranged in a plane in common with a longitudinal axis of the fixed bearing.

5. The disk brake according to claim 1, wherein the guide bush is formed from a section of a profiled band of material.

6. The disk brake according to claim 5, wherein said section is rolled to form the guide bush such that an outer surface of the guide bush is cylindrical.

7. The disk brake according to claim 6, wherein the profiled band of material has two wavy profilings extending in a longitudinal direction, which wavy profilings include a first height of wave crests corresponding to a largest wall thickness of the guide bush and a second height of wave troughs adjoining the wave crests corresponding to a smallest wall thickness of the guide bush.

8. The disk brake according to claim 5, wherein a width of the profiled band of material corresponds approximately to the circumference of the guide bush.

9. The disk brake according to claim 6, wherein a width of the profiled band of material corresponds approximately to the circumference of the guide bush.

10. The disk brake according to claim 7, wherein a width of the profiled band of material corresponds approximately to the circumference of the guide bush.

11. The disk brake according to claim 5, wherein the profiled band of material has a plurality of parallel wavy profilings extending at a distance from one another.

12. The disk brake according to claim 11, wherein a first height of the wave crests correspond to a largest wall thickness of the guide bush and a second height of the wave troughs correspond to a smallest wall thickness of the guide bush.

13. The disk brake according to claim 11, wherein a width of the profiled band of material corresponds to a length of the guide bush.

14. The disk brake according to claim 11, wherein each section of the profiled band of material forming the guide bush has two wave crests and two wave troughs.

15. The disk brake according to claim 1, wherein the guide bush has an alignment marking corresponding with an alignment marking of the caliper.

16. The disk brake according to claim 5, wherein the profiled band of material consists of either a steel material coated with a slide coating, a bronze material, a brass material, a plastic material, or a composite material.

17. A disk brake for a vehicle, comprising:

a caliper adapted to straddle a brake disk, said caliper being axially displaceable relative to the brake disk;

two fixing elements by which the caliper is fixed to a brake support of the vehicle, one fixing element being a fixed bearing and the other fixing element being a movable bearing;

wherein the movable bearing comprises a guide bush having a uniform wall thickness and a bearing bolt, which bearing bolt is guided in the guide bush, is movable radially relative to the guide bush, and has an oval cross-section.

18. The disk brake according to claim 17, wherein a largest cross-sectional measurement of the oval bearing bolt corresponds approximately to an inner diameter of the guide bush having the uniform wall thickness.

19. The disk brake according to claim 18, wherein a smallest cross-sectional diameter of the oval bearing bolt is arranged in a plane in common with a longitudinal axis of the fixed bearing.

20. The disk brake according to claim 17, wherein the bearing bolt has an alignment marking corresponding with an alignment marking of the caliper.

* * * * *